Oct. 11, 1949.  J. BOYCE  2,484,070
POWDER COOLER
Filed Nov. 5, 1945

INVENTOR:
JOHN BOYCE
BY
ATTORNEY

Patented Oct. 11, 1949

2,484,070

UNITED STATES PATENT OFFICE 2,484,070

POWDER COOLER

John Boyce, San Jose, Calif., assignor to Food Machinery and Chemical Corporation, a corporation of Delaware Application November 5, 1945, Serial No. 626,828

2 Claims. (Cl. 259—43)

This invention relates to apparatus for conducting a continuous operation on powdered material.

In many manufacturing processes such as in the production of powdered foods, including powdered egg and dried milk powder, it may be desirable to heat or cool a hygroscopic powder or otherwise treat the same while excluding the atmosphere from contact therewith, and in some instances subject the powder during this operation to a controlled gas treatment.

It is an object of this invention to produce a novel apparatus by which such an operation may be continuously performed.

In continuous processes, it is not always possible to maintain the flow of material between successive treating units at a uniform rate.

It is another object of this invention to provide an apparatus as aforesaid which will continue to function satisfactorily throughout substantial periods during which the powder handled thereby is fed thereto at an abnormally high rate or taken therefrom at an abnormally low rate.

A further object of the invention is to provide an apparatus as aforesaid in which the powder itself provides seals for the inlet and outlet passages of the apparatus.

While adaptable for performing a wide variety of continuous operations, the invention will for illustrative purposes, be described herein as when used for continuously cooling egg powder having a relatively low moisture content.

The manner of accomplishing the foregoing objects as well as further objects and advantages will be made manifest in the following description taken in connection with the accompanying drawings in which.

Figure 1:
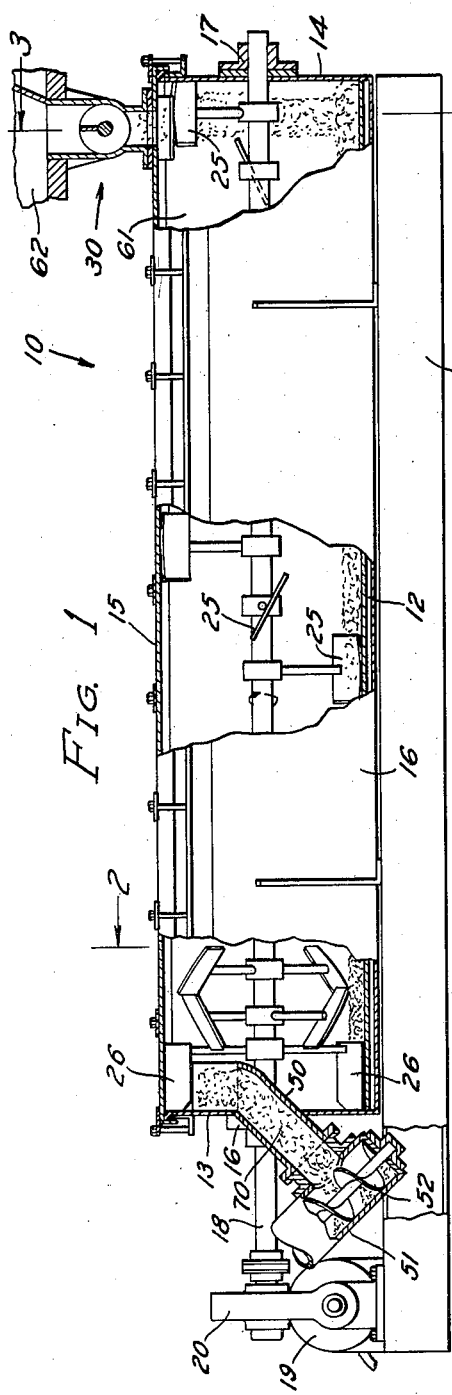
Fig. 1 is a side elevational view of a preferred form of the invention partially broken away to illustrate normally hidden portions of the mechanism.
Figure 2:
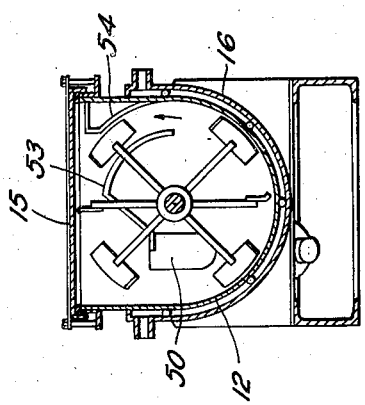
Fig. 2 is a cross-sectional view taken on the line 2—2 of Fig. 1.

Referring specifically to the drawings, the powder cooler illustrated therein may be designated generally by the numeral 10. This cooler is mounted on a base 11 and includes a long powder mixing and cooling trough 12 which has end walls 13 and 14 and a cover 15 and is provided with a water jacket 16. Extending longitudinally through the trough 12 and journalled in bearings 16a and 17 provided on the trough ends, is a heavy shaft 18 which is adapted to be slowly rotated by a motor 19 which connects with the shaft through a worm and gear mechanism 20. The direction of rotation is indicated by the arrows in Figs. 1, 2 and 3. Provided on the shaft 18 within the trough 12 is a series of powder mixing and progressing paddles 25 which are inclined to cause a longitudinal movement of powder in the trough 12 from the receiving end of the trough to the discharge end thereof, which is to say from the right end to the left end thereof as shown in Fig. 1.

Also fixed on the shaft 18 at the discharge end of the trough 12 are scoop paddles 26.

The cooler 10 is equipped with a powder delivery mechanism 30 at the receiving end thereof which includes a screw conveyor 31 having a screw 32 rotatably mounted in a screw trough 33 one end of which has a neck 34 which makes a fluid tight connection with a hole 35 formed in the cooler trough cover 15.

Figure 4:
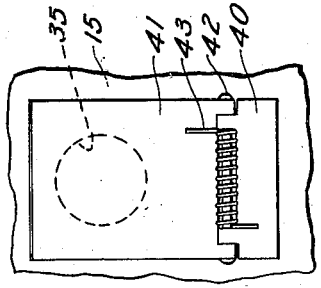
Fig. 4 is an enlarged detail bottom plan view of the inlet powder valve of the invention.
Figure 3:
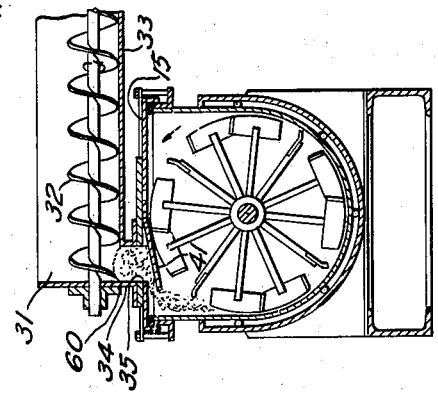
Fig. 3 is a cross-sectional view taken on the line 3—3 of Fig. 1.

Secured as by welding to the bottom surface of the cover 15 adjacent the hole 35 is the base 40 of a powder gate 41 which is hingedly connected to the base by a pin 42 and yieldably held upwardly in the position in which the gate is shown in Fig. 3 by a coil spring 43 (Fig. 4).

Mounted in the cooler trough end 13 is a discharge hopper 50, the upper end of which extends within the space about which the scoop paddles 26 rotate and the lower end of which connects with the receiving end of a cylindrical housing 51 of an elevating screw conveyor 52. Also secured on the end wall 13 are guide walls 53 and 54 which are disposed respectively within and outside of the path traversed by the scoop paddles 26 so as to assist in the delivery of powder engaged by these paddles into the hopper 50.

Operation

The cooler 10 is adapted to be employed in a wide variety of processes in which it is necessary to give a treatment to a powdered material. In the form in which the invention is disclosed herein, it is especially adapted for cooling organic hygroscopic powders. In producing powdered eggs with a relatively low moisture content the powder is first formed by spraying the liquid egg into heated air which produces an egg powder with a moisture content of about 5%. To render this relatively unsusceptible to deterioration this powder is redried to reduce the moisture content to below 1%. A process suitable for accomplishing this is disclosed in the co-pending application of W. N. Lindsay and P. C. Wilbur filed herewith. In the redrying of the egg powder in this process, the powder is rendered extremely hygroscopic and is heated to approximately 175° F. To prevent this heat damaging the powder, it is necessary that it be cooled rapidly from this high temperature while excluding the atmosphere from contact with the powder. The latter precaution is necessary because the hygroscopic character of the powder would cause it to rapidly absorb atmospheric moisture if it were exposed to the atmosphere.

The powder cooler 10 is adapted to cool this powder after it has been redried in the Lindsay-Wilbur process.

The powder cooler 10 is designed to receive this powder, cool it below a temperature of 100° F., while excluding the atmosphere from contact with the powder and while still shielding the powder from the atmosphere, deliver this powder upwardly by means of the screw conveyor 52 to an apparatus by which the powder may be packaged in vacuum or in an atmosphere of an inert gas such as $CO_2$.

Before any of this powder is fed to the powder cooler 10, the latter is cooled by establishing a circulation of water through the water jacket 16 to bring the temperature of the cooler down to about 50-60° F.

When the cooler 10 has been properly cooled and water is circulating through the jacket 16 to keep it cool, the screw conveyors 32 and 52 and the shaft 18 are rotated at predetermined rates so as to cause an orderly delivery of powdered material to the cooler 10, as this is available, and to cause a discharge of powder from the discharge end of the cooler, as will be made clear hereinafter.

Rotation of the screw 32 continuously delivers powder from the trough 33 through the neck 34 to the opening 35. The gate 41 prevents this powder dropping directly downwardly through the hole 35, but permits powder to be forced downwardly through this hole and past the gate 41 as fresh powder is delivered downwardly to the neck 34 by the screw 32. The spring 43 holds the gate 41 upwardly so as to maintain a body of powder 60 in the neck 34 which seals off the cooling chamber 61 formed within the cooler 10 from the redrier 62 with which the trough 33 communicates freely.

From this it will be noted that powder is continuously delivered by the delivery mechanism 30 into the cooling chamber 61 of the cooler 10 without admitting outside atmosphere into contact with the powder thus delivered or without admitting atmosphere from the redrier 62 into the chamber 61.

The powder thus admitted to the chamber 61 is engaged by the paddles 25 so as to sweep this powder repeatedly against the inner walls of the cool inner surface of the trough 12, whereby the heat in this powder is transferred to these walls and from the latter to the water circulated in the jacket 16.

The paddles 25 also thoroughly mix the powder while this is in the cooler 10 so that when this powder is delivered from the cooler it is homogeneous in quality.

The paddles 25 also cause the powder engaged thereby to progress from the receiving end of the cooling chamber 61 to the discharge end where it is delivered within the path of the scoop paddles 26. These paddles lift portions of the powder engaged thereby upwardly between the guide walls 53 and 54 and deliver these into the open mouth of the hopper 50. Falling into the latter, the powder gravitates into the housing 51 of the screw conveyor 52 and is lifted by the constant rotation of this conveyor to where the powder is sealed up in cans.

The conveyor 52 is normally operated at a rate which is just short of that necessary to remove all of the powder from the hopper 50 as this is delivered thereto by the scoop paddles 26. Thus a body 70 of powder is maintained in the hopper 50 which operates as a seal closing the discharge end of the cooling chamber 61 to any flow of gas or atmosphere from the conveyor housing 51 into the cooling chamber 61.

From the foregoing it is clear that no opportunity is given the powder passing through the chamber 61 of having any contact with the atmosphere or any other moisture laden air or gas. It is thus given no opportunity to absorb any moisture while it is being cooled.

I claim:

1. In a powder handling device, the combination of: a trough disposed substantially horizontally; a shaft; means for journalling said shaft horizontally in said trough; a series of progressor paddles mounted on said shaft, said paddles being helically angled; means for rotating said shaft to cause said paddles to engage powder in said trough to spread said powder over the inner surface of said trough and cause the powder to progress towards one end of said trough; a hopper extending into said trough from said end thereof, there being a free space in said trough encircling said hopper; a pair of discharge paddles mounted on said shaft including arms located to swing in a plane disposed inwardly from said hopper but close thereto, and blades mounted on the ends of said arms and extending into said free space encircling said hopper so that said blades encircle said hopper when said shaft rotates; and a guide wall disposed inwardly from and adjacent the path followed by said blades to cooperate with each of said blades to support a mass of powder propelled upwardly by said blade and guide said powder into said hopper when said blade moves out of contact with said mass of powder.

2. A combination as in claim 1 in which an initial portion of said guide wall is substantially concentric with said shaft and in which a concluding portion of said guide wall slopes steeply toward and terminates at the adjacent edge of said hopper.

JOHN BOYCE.

REFERENCES CITED

The following references are of record in the file of this patent:

UNITED STATES PATENTS

| Number | Name | Date |
| --- | --- | --- |
| 292,681 | Reaney | Jan. 29, 1884 |
| 299,370 | Fletcher et al. | May 27, 1884 |
| 583,751 | James | June 1, 1897 |
| 1,396,740 | Ganelin | Nov. 15, 1921 |
| 1,478,865 | Weber | Dec. 25, 1923 |
| 1,823,443 | Gamm | Sept. 15, 1931 |
| 1,919,878 | Brownlee | July 25, 1933 |
| 1,999,411 | Haney | Apr. 30, 1935 |
| 2,074,988 | O'Brien et al. | Mar. 23, 1937 |
| 2,219,863 | Cronk | Oct. 29, 1940 |